United States Patent [19]

Shono

[11] 4,200,385
[45] Apr. 29, 1980

[54] LENS SHUTTER USE AND NON-USE SWITCHING DEVICE OF AN INTERCHANGEABLE LENS HAVING A LENS SHUTTER FOR USE WITH A FOCAL PLANE SINGLE LENS REFLEX CAMERA

[75] Inventor: Tetsuji Shono, Kawagoe, Japan

[73] Assignee: Asahi Kogaku Kogyo Kabushiki Kaisha, Tokyo, Japan

[21] Appl. No.: 922,472

[22] Filed: Jul. 6, 1978

[30] Foreign Application Priority Data

Jul. 6, 1977 [JP] Japan ................................ 52-80570

[51] Int. Cl.² ............................................. G03B 9/58
[52] U.S. Cl. ..................................... 354/233; 354/236
[58] Field of Search .............. 354/233, 236, 286, 228, 354/229

[56] References Cited

U.S. PATENT DOCUMENTS

| 2,708,395 | 5/1955 | Wagner et al. | 354/236 X |
| 3,635,142 | 1/1972 | Ataka | 354/236 X |
| 3,648,588 | 3/1972 | Alfredsson et al. | 354/236 X |
| 3,675,561 | 7/1972 | Schwarz | 354/236 X |

*Primary Examiner*—L. T. Hix
*Assistant Examiner*—Shelley Wade
*Attorney, Agent, or Firm*—Sughrue, Rothwell, Mion, Zinn and Macpeak

[57] ABSTRACT

In the present invention, stopping-down, sector preliminary closure and lens shutter release are effected in association with an interlocking member of the lens. The difference between the amount of operation of the interlocking member effected when a camera with an electronic eye, hereinafter an EE control mechanism is operated is obtained by varying the amount of operation of the interlocking member, regardless of the pressure or absence of EE control provided by the EE control mechanism. The use and non-use of the lens shutter is switched depending on this difference. The relating means between the camera and the lens is substantially identical to the relating means between an ordinary interchangeable lens not having a lens shutter and an automatic aperture. Therefore, for switching between the lens shutter use and non-use, it is unnecessary to provide an additional relating means between the lens and the camera. If the lens shutter is not used, the lens can be used in the same manner as if it was an ordinarily interchangeable lens.

Furthermore, in the present invention, the shutter speed of a focal plane shutter is switched to a constant speed in association with the switching operation to use the lens shutter. Therefore, unlike the case where a conventional focal plane single lens reflex camera and an interchangeable lens with a lens shutter are employed, it is unnecessary in the present invention to switch the shutter speed of the focal plane shutter to a constant speed separately when the lens shutter is used. The associated switching of the present invention is foolproof, and contributes to an improvement in operation.

11 Claims, 7 Drawing Figures

LENS SHUTTER USE AND NON-USE SWITCHING DEVICE OF AN INTERCHANGEABLE LENS HAVING A LENS SHUTTER FOR USE WITH A FOCAL PLANE SINGLE LENS REFLEX CAMERA

BACKGROUND OF THE INVENTION

A focal plane shutter subjects a film to a slit exposure. Therefore, a focal plane shutter is disadvantageous in the case where it is necessary to photograph clearly an object moving at high speed or in the case where synchronous photographing is effected with an electronic flash whose light emission duration is very short.

In order to overcome the difficulties, a variety of methods have been proposed in which an interchangeable lens with a lens shutter (hereinafter referred to merely as "a lens") is combined with a focal plane single lens reflex camera (hereinafter referred to merely as "a camera"). In such system, when the focal plane shutter is fully opened, the lens shutter is operated.

SUMMARY OF THE INVENTION

In the present invention, stopping-down, sector preliminary closure and lens shutter release are effected in association with an interlocking member of the lens. The difference between the amount of operation of the interlocking member effected when a camera with an electronic eye, hereinafter an EE control mechanism, is operated is obtained by varying the amount of operation of the interlocking member, regardless of the pressure or absence of EE control provided by the EE control mechanism. The use and non-use of the lens shutter is switched depending on this difference. The relating means between the camera and the lens is substantially identical to the relating means between an ordinary interchangeable lens not having a lens shutter and an automatic aperture. Therefore, for switching between the lens shutter use and non-use, it is unnecessary to provide an additional relating means between the lens and the camera. If the lens shutter is not used, the lens can be used in the same manner as if it was an ordinarily interchangeable lens.

Furthermore, in the present invention, the shutter speed of a focal plane shutter is switched to a constant speed in association with the switching operation to use the lens shutter. Therefore, unlike the case where a conventional focal plane single lens reflex camera and an interchangeable lens with a lens shutter are employed, it is unnecessary in the present invention to switch the shutter speed of the focal plane shutter to a constant speed separately when the lens shutter is used. The associated switching of the present invention is foolproof, and contributes to an improvement in operation.

The stopping-down, sector preliminary closure and the lens shutter release are essential for the lens shutter of a lens shutter type single lens reflex camera. Merely by changing the operational sequence of these essential mechanisms and by adding a governer for obtaining a delay having the period between the lens shutter release to the lens shutter operation (sector operation), the arrangement of the present invention can be applied to a lens shutter for lens-shutter-type commercially-available single lens reflex camera without major modifications. Thus, the present invention is also very suitable for a camera in which the focal plane shutter is primarily used and the lens shutter is secondarily used.

DETAILED DESCRIPTION OF THE PREFERRED EMBODIMENTS

Figure 1:
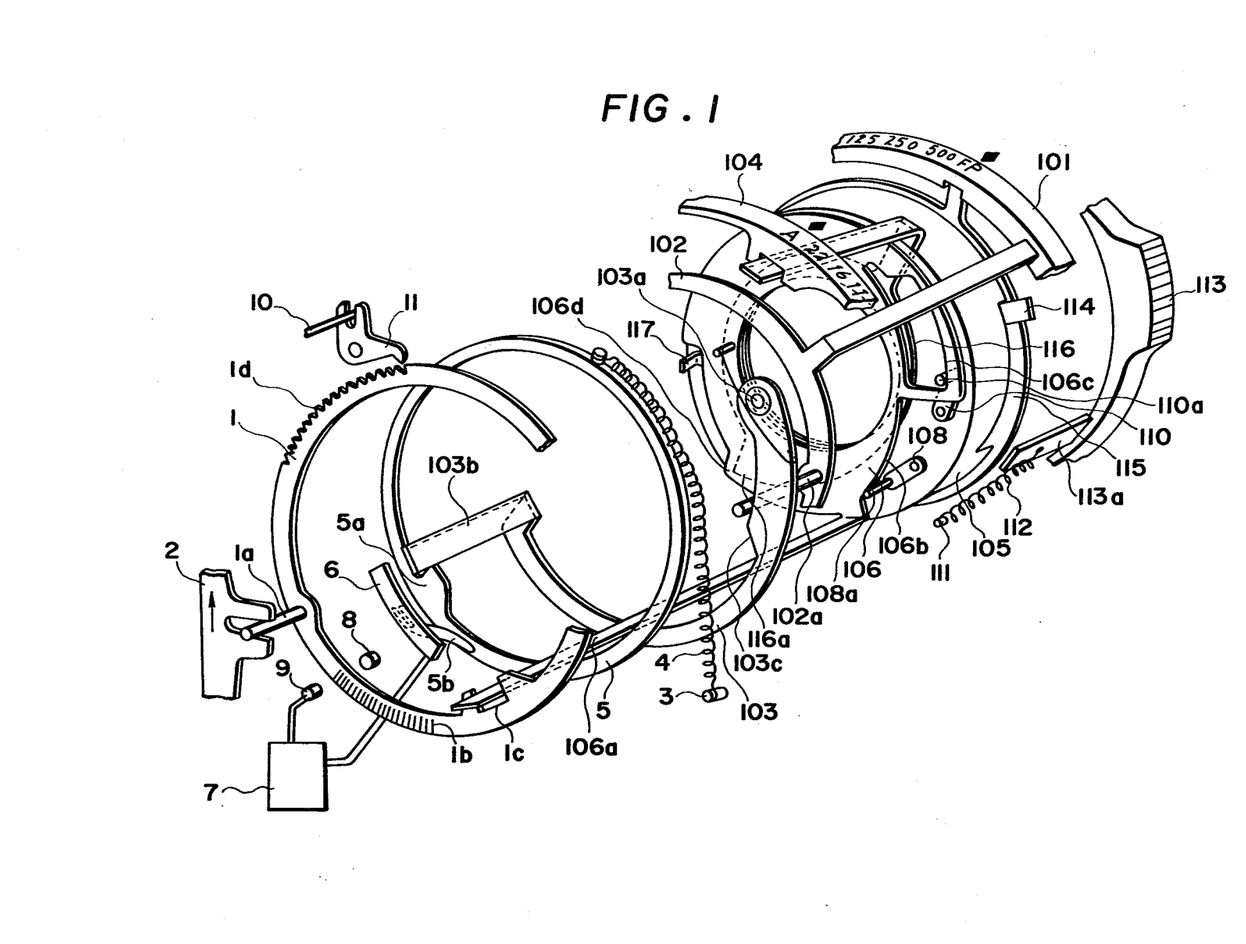
FIG. 1 is a perspective view of the present invention directed to the case where a lens shutter use and non-use switching member on the lens side is switched over to the lens shutter non-use side, and the switching operation is effected by the EE control of the camera. The states of various elements shown in FIG. 1 are those prior to the operation of the camera.
Figure 2:
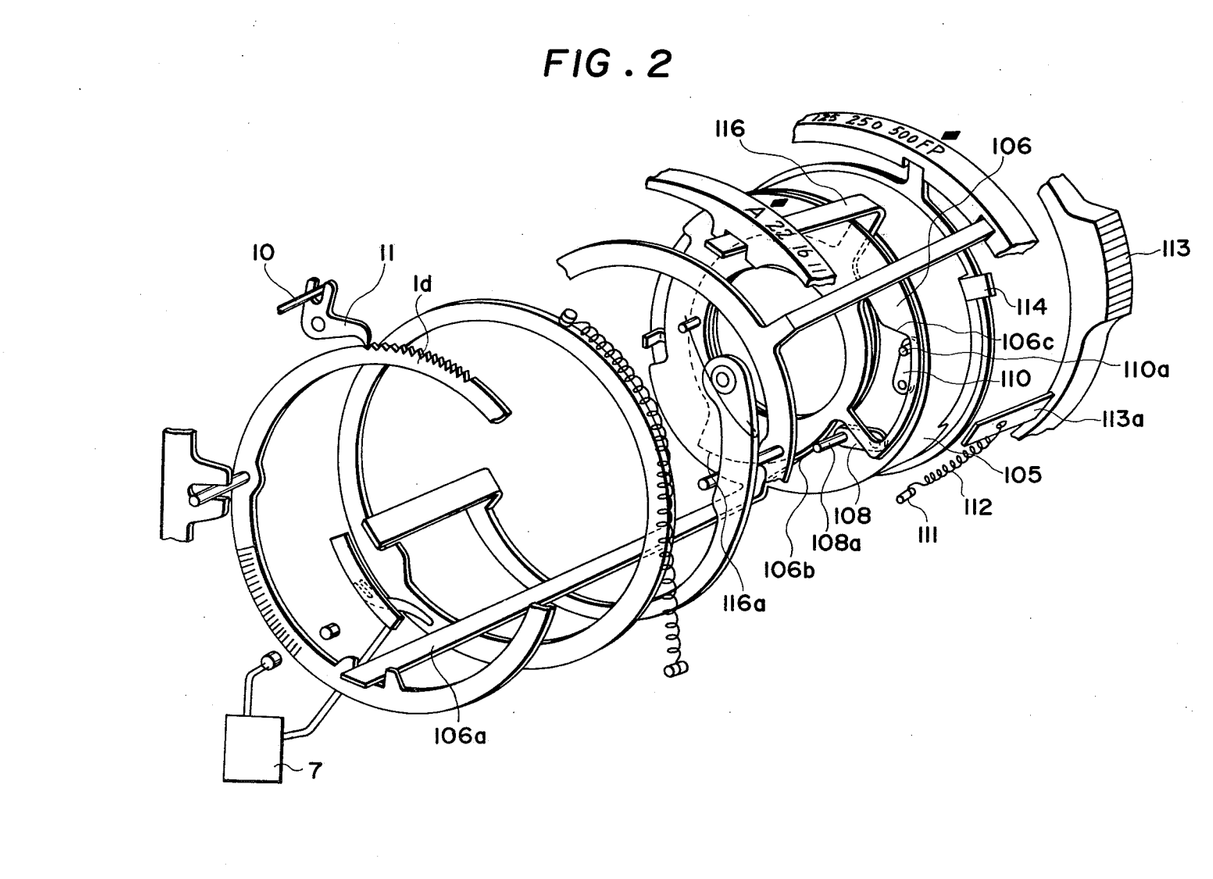
FIG. 2 shows the states of the various elements shown in FIG. 1 at the operation of the camera.
Figure 3:
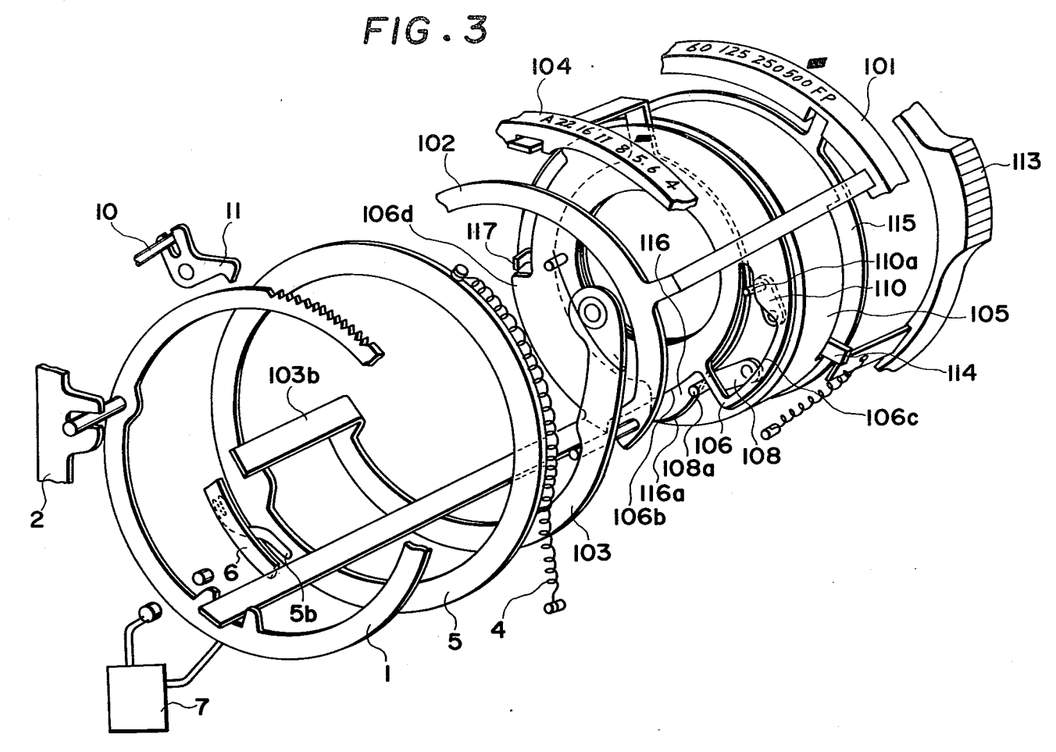
FIG. 3 is a diagram for the case where the switching member shown in FIG. 1 is switched over to the lens shutter use side, and the shown states of the various elements are those obtained when the camera is operation.

Referring now to FIGS. 1 through 3, the case where the lens shutter use and non-use switching member is provided on the lens side, and the switching operation is effected by the EE control of the camera will now be described.

Referring to FIG. 1, reference numeral 1 designates an aperture drive member of a camera (not shown) which is supported rotatably around the optical axis. A pin 1a embedded in the aperture drive member 1 is engaged with a groove of an interlocking lever 2 interlocking with a mirror operating mechanism (not shown) of the camera. A relay ring 102 is rotatably supported in the lens barrel (not shown) and has a rod section 102c which is engaged with the groove of a lens shutter speed selector ring 101, which is also rotatably supported in the lens barrel, so that the ring 102 can be moved together with the ring 101. A pin 102a is fixed secured to relay ring 102. A switching signal lever 103 is provided on one end of the lens barrel in such a manner that it can turn around a shaft 103a, and has a cam surface 103c that engages pin 102a.

When the lens shutter speed selector ring 101 is turned to a mark "FP" indicating non-use of the lens shutter, the cam surface 103c is depressed to the right, and the switching signal lever 103 is therefore turned counterclockwise to a position indicated in FIG. 1. At the same time, a rod 103b of the switching signal lever 103 depresses to the right the protrusion 5a of a switching signal ring 5 which is rotatably supported in the camera and tends to turn clockwise by means of a restoring spring 4 connected between the switching signal lever 103 and a pin 3 embedded in the camera, as a result of which the switching signal ring 5 is turned counterclockwise to a position indicated in FIG. 1.

In the above-described operation, an electrically insulated brush 5b of the switching signal ring 5 is brought into electrical contact with a pattern (not shown) on a slide switch substrate 6 fixedly secured to the camera, as a result of which a signal indicating the lens shutter non-use is applied to a control circuit 7 of the camera.

In the case of FIG. 1, an aperture scale ring 104 rotatably supported in the lens barrel is set at "A". Therefore, a signal for carrying out an EE control, wherein the aperture is automatically varied with respect to a shutter speed set up by an electrical control focal plane shutter (not shown), an ASA sensitivity and a brigtness of an object, is transmitted to the control circuit 7 by an aperture value interlocking mechanism (not shown). FIG. 1 shows the case where the camera is set to the lens shutter non-use under EE control. When a release button (not shown) of the camera is depressed, the interlocking lever 2 starts moving upward, as indicated by the arrow in FIG. 1, and the aperture drive member 1 starts turning clockwise. Furthermore, upon depression of the release button, an LED light emitting element 8 of the camera emits light, which is applied through a group of slits 1b formed in the aperture control member 1 to a light receiving element 9 of the camera. In this case, the light is transmitted to the light receiving element 9 in the form of pulses corresponding the number of slits 1b through which the light passes. That is, the amount of movement of the aperture drive member 1 is converted into the number of pulses which is applied to the control circuit 7. A rod 106a of an interlocking member 106, which is rotatably supported in a lens shutter body 105 secured to the lens barrel, is engaged with a groove 1c of the aperture drive member 1, and therefore, the aperture drive member 1 of the camera and the interlocking member 106 of the lens move through an equal rotational angle.

When the aperture drive member 1 described above is turned clockwise to a position corresponding to a correct exposure value, as shown in FIG. 2, a signal is applied from the control circuit 7 to a magnet (not shown) in the camera to operate the magnet. As a result, a pin 10 operating in association with the magnet is moved right, while a locking lever 11, which is rotatably supported in the camera and has a groove engaged with the pin 10, is turned clockwise to abut against a saw-tooth-shaped section 14 of the aperture drive member 1 to lock the member 1.

FIG. 2 shows the case where the aperture drive member 1 is locked at the end point in the EE control range. The interlocking member 106 is turned clockwise by turning the aperture drive member 1. Therefore, an aperture diameter corresponding to the locking position of the aperture drive member 1 under the EE control is determined by an EE control aperture value cam surface 106 of the interlocking member 106 and by a pin 108a embedded in a preview lever 108. The preview lever 108 is rotatably supported in the lens shutter body 105, and operates in association with aperture blades 107 (shown in FIGS. 6 and 7 only) provided in the lens shutter body 105, and is subjected to an elastic force exerted to stop down the aperture blades 107 at all times.

Sector blades 109 (shown in FIGS. 6 and 7 only) rotatably supported in the lens shutter body 105 are maintained open both by a sector opening and by the closing cam surface 106 of the interlocking member 106 and a pin 110 embedded in a sector opening and closing lever 110. The opening and closing lever 110 operates in association with the sector blades 109 and is energized elastically to open the sector blades 109 at all times, with respect to the locking position of the aperture drive member 1 under the EE control.

When the interlocking lever 2 is moved upward, a mirror operating mechanism (not shown) of the camera is operated to cause a mirror (not shown) to jump. When the operation of an electrical control focal plane shutter (not shown) of the camera is completed, the mirror operating mechanism is restored, while the states of the interlocking lever 2 and the interlocking member 106 are returned from the states shown in FIG. 2 to the states shown in FIG. 1, and simultaneously the state of the aperture blades 109 is also returned from the state shown in FIG. 7 to the state shown in FIG. 6.

In the above-described operation, as shown in FIGS. 1 and 2, counterclockwise rotation of a charge operation ring 113 causes the charge to be maintained on a charge ring 114 adapted to perform the lens shutter charge. This charge operation is due to the fact that the charge operation ring 113 is slightly energized to turn clockwise by restoring spring 112 connected to a spring hook embedded in the lens barrel, and a rod 113a of the charge operation ring 113 is supported rotatably around the lens shutter body 105. The above-described operation can be repeatedly conducted without the charge operation of the charge ring 114. For instance, in the case where, as shown in FIG. 2, the aperture drive member 1 cannot be brought to the position corresponding to the correct exposure, or the position of the aperture drive member 1 is out of the EE interlocking range, even with the end point in the EE control range, the control circuit 7 can be processed so that the locking lever 11 locks at the end point in the EE control range at the time of EE control.

The operation with respect to the lens shutter use will now be described with reference to FIG. 3.

When the lens shutter speed selector ring 101 is set to 500, 250, etc. other than "FP", the protrusion of a shutter speed conversion ring 115, which is supported rotatably around the lens shutter body 105, is engaged with a groove of the lens shutter speed selector ring 101. As a result, the lens shutter speed selector ring 101 and the lens shutter speed conversion ring 115 can move the same rotational angle as one unit, and therefore, a lens shutter speed such as 1/500 or 1/250 can be selected (the shutter speed being set to 1/500 in FIG. 3).

When the lens shutter speed selector ring 101 is set to 500 from FP, the relay ring 102 is turned clockwise and the switching signal lever 103 is also turned clockwise. Therefore, the rod 103b is retracted to the left, as a result of which the switching signal ring 5 is turned clockwise by the elastic force of the restoring spring 4. As a result, the brush 5b is brought into electrical contact with the pattern (not shown) on the slide switch substrate 6, causing the signal for use of the lens shutter to be applied to the control circuit 7.

The aperture scale ring 104 is set to "8", and a rod of a manual control cam ring 116, which is rotatably supported on the lens shutter body 105, is engaged with the groove of the aperture scale ring 104. Therefore the aperture scale ring 104 and the manual control cam ring 116 can move the same rotational angle as one unit. In addition, a cam surface 116a of the manual control cam ring 116 is engaged with a pin 108a of the preview lever 108. Therefore, when the EE control cam surface 106b of the interlocking member 106 is retracted, the pin 108a is abutted against the cam surface 116a. Thus, the aperture diameter is determined by the position of the aperture scale ring 104.

In the case where, as shown the aperture scale ring 104 is set to other than A, as shown in FIG. 3, the signal indicating no need for EE control is applied to control circuit 7 by means of the aperture value interlocking mechanism (not shown). However, in this case, the lens shutter non-use signal is transmitted to the control circuit 7. Therefore, when the aperture drive member 1 comes to the end point in the EE control range, the control circuit 7 instructs the locking lever 11 to lock the saw-tooth-shaped section 1d. That is, in the arrangement shown in FIG. 1, the above-described aperture drive member 1 cannot come to the sector preliminary closure range and the lens shutter release range without the lens shutter use signal.

When the release button (not shown) is depressed, both the aperture drive member 1 and the interlocking member 106 start turning clockwise. Under the conditions shown in FIG. 3, the lens shutter use signal has been applied to the control circuit 7. Therefore, the aperture drive member 1 is not locked by the locking lever 11, and therefore, the aperture drive member 1 is further turned clockwise and passes through the end point in the EE control range.

Figure 7:
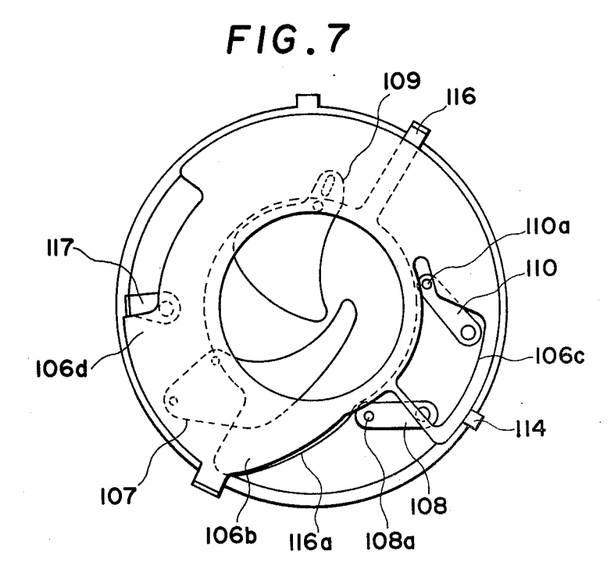
FIG. 7 is a diagram showing the sector blades in FIG. 6, which are preliminarily closed, used in the description of movement of the aperture blades and the sector blades.

At the time instant of the end point in the EE control range, the EE control cam surface 106b has retracted, and therefore, the pin 108a is abutted against the cam surface 116a so as to determine the aperture diameter corresponding to F8. When the aperture drive member passes through the end point of the EE control range, the sector opening on closing cam surface 106c pushes the pin 110a embedded in the selector opening and closing lever 110. As a result, the sector opening and closing lever 110 is turned counterclockwise, and the sector blades 109 are closed preliminarily, as shown in FIG. 7. On the other hand, a release lever abutting section 106d of the interlocking member 106 is abutted against a release lever 117, as a result of which the release lever 117 is turned clockwise to release the lens shutter. This is due to the release lever 117, which is rotatably supported on the lens shutter body 105 and is adapted to lock the lens shutter charge.

In addition, because of the upward movement of the interlocking lever 2, the mirror operating mechanism (not shown) of the camera is operated to cause the mirror (not shown) to jump. At the same time, the electrical control focal plane shutter (not shown) of the camera is released. In this case, because it is undesirable that the lens shutter operates before the top curtain of the electrical control focal plane shutter is fully opened, it is necessary to provide a delay time having a period defined by the release of the lens shutter to operation of the lens shutter. Accordingly, a governer (not shown) is operated in the lens shutter to provide the delay time. In this connection, it should be noted that if the provision of a signal representative of the full open of the top curtain is regarded as the release of the lens shutter, it is unnecessary to provide the delay time; however, the connection between the lens and the body is correspondingly increased.

Since the lens shutter use signal has been applied to the control circuit 7, as described above, a margin time can be added to the slowest (for instance 1/30) of the shutter speeds of the lens shutter so that the bottom curtain (not shown) under control of the electrical control focal plane shutter runs after the operation of the lens shutter is completed. For instance, the control circuit 7 is connected to control an electrical control focal plane shutter operating mechanism (not shown) so that the focal plane shutter runs in $\frac{1}{8}$ second period. When the bottom curtain of the electrical control focal plane shutter runs, the mirror operating mechanism is restored so as to restore the mirror, while the states of the interlocking lever 2 and the interlocking member 106 are restored to the states shown in FIG. 1 from the states shown in FIG. 3. In addition, the aperture blades 107 are also restored to the state shown in FIG. 6 from that shown in FIG. 7.

Figure 6:
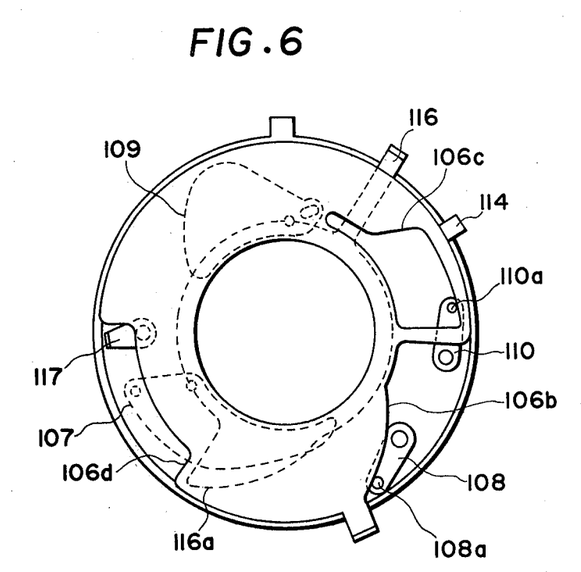
FIG. 6 is a front view of the lens shutter, showing the open sector blades and aperture blades.

At the completion of the operation of lens shutter, the sector blades 109 are not opened, because a strong force is exerted on sector blades 109 so as to close the sector blades 109 by means of a sector opening and closing mechanism (not shown) in the lens shutter. The sector blades are opened by turning the charge operation ring 113 counterclockwise, causing charge ring 114 to be moved to its charged position, as shown in FIG. 1, from its position shown in FIG. 3. Simultaneously, the force provided by the sector opening and closing mechanism so as to close the sector blades 109 is eliminated. As a result, the sector blades 109 are restored to the open state, as shown in FIG. 6, from the state shown in FIG. 7. In addition, the sector opening and closing lever 110 is turned clockwise to the state shown in FIG. 1 from the state shown in FIG. 3.

It should be noted that depending on the arrangement of the internal operating mechanism of the lens shutter, that it is possible that the sector opening and closing lever 110 is restored by the restoring operation of the interlocking member 106, and that the sector blades 109 are opened before the charge is effected with the charge operation ring 113. Such a mechanism is already commercially available, and it offers the advantage that the finder is not dark or closed after the operation of the camera.

In order to provide a warning means for clearly issuing a warning signal when the lens shutter is used but the lens shutter charge is not effected, it is necessary for instance to provide a cooperation mechanism. Such a cooperation mechanism transmits the movement of the charge operation ring 113 to the camera, and this movement is displayed in some fashion in the finder of the camera. Accordingly, the dark change of the finder is more effective and simpler technique for the use to effect a re-charge because the lens shutter has been operated. For this reason, the above-described arrangement is employed.

Figure 4:
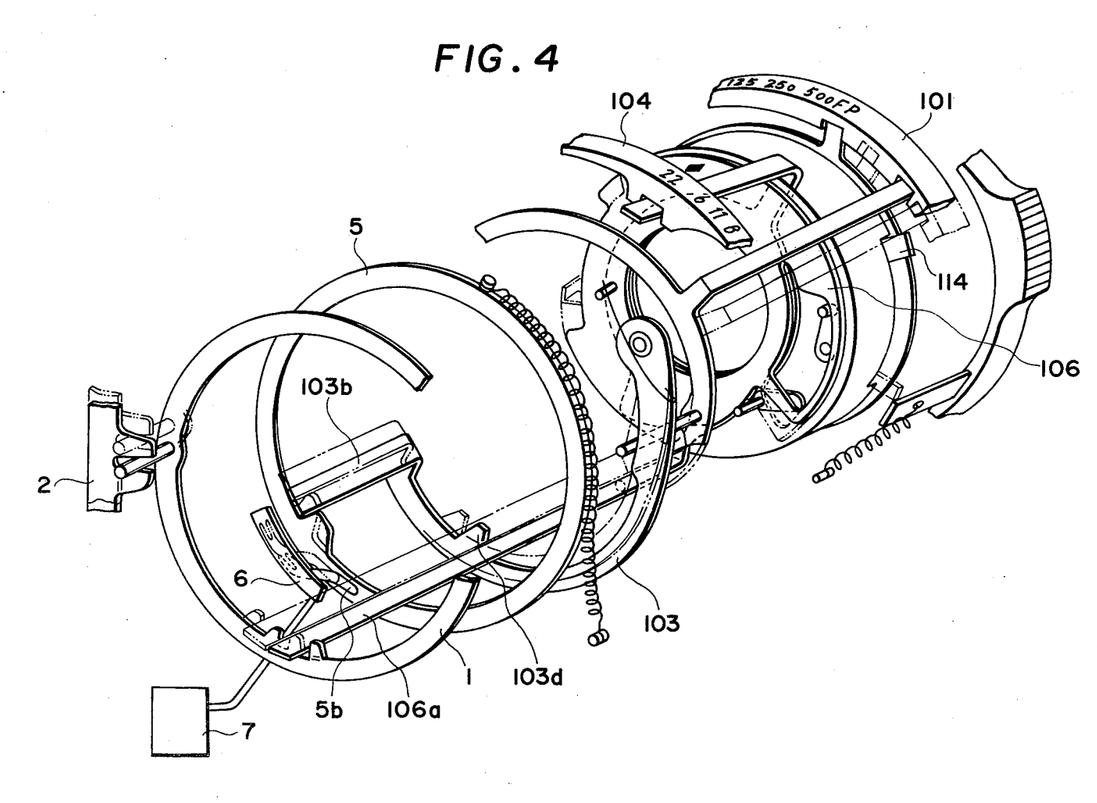
FIG. 4 is a perspective view for the case where the camera has no EE control, the lens shutter use and non-use switching member on the lens side is switched over to the lens shutter non-use side, and the switching operation being effected by a blocking member in the lens. The states of the various elements are those obtained when the camera is operated.

The case when the lens shutter use and non-use switching member is provided on the lens side of a camera, where the EE control is not employed, and where the switching operation is effected by a blocking member, will be described with reference to FIG. 4. The arrangement shown in FIG. 4 is different from that shown in FIG. 1 because of the following. Because the camera has no EE control mechanism, the arrangement shown in FIG. 4 does not have any slits 1b and does not have a saw-tooth-shaped section 1d, as shown in FIG. 1. In addition, the aperture drive member 1 carries out a constant reciprocation at all time. Moreover, no EE control section is provided for the control circuit, and consequently, no light receiving element 9 and light emitting element (LED) 8 are provided.

Referring now to FIG. 4, when the lens shutter speed selector ring 101 is set to "FP", representative of the lens shutter non-use, the rod 103b of the switching signal lever 103 is positioned as indicated by the solid line in FIG. 4. In addition, the brush 5b is positioned as indicated by the solid line in FIG. 4 so as to be brought into electrical contact with the pattern (not shown) on the slide switch substrate 6. This electrical contact produces a signal respresenting the lens shutter non-use, which is applied to the control circuit 7 of the camera. The aperture scale ring 104 has no "A", and it serves merely as an automatic aperture presetting member.

When the aperture interlocking lever 2, the aperture drive member 1, and the rod 106a of the interlocking member 106 are positioned, as indicated by the solid lines by depressing the release button (not shown), the rod 106a is abutted against the abutting section 103d of the switching signal level 103, and therefore, the interlocking member 106 is retained there. This state is identical to that shown in FIG. 2 except that the aperture diameter (not shown) in the lens shutter is determined by the aperture scale ring 104 in FIG. 4. The lens shutter is not released, and the lens may be used in the same manner as in the case of an ordinary lens.

When the lens shutter speed selector ring 101 is set to a position other than "FP", the switching signal lever 103 is turned clockwise to the position indicated by the two-dot chain line in FIG. 4, and consequently, the switching signal ring 5 is turned clockwise. As a result, the brush 5b is positioned as indicated by the two-dot chain line in FIG. 4 so as to be brought into electrical contact with the pattern (not shown) on the slide switch substrate 6, whereby the signal representing lens shutter use is provided to the control circuit 7 of the camera. When interlocking lever 2, aperture drive member 1, and rod 106a of the interlocking member 106 are positioned as indicated by the two-dot chain lines in FIG. 4 by the depression of the release button (not shown) of the camera, rod 106a is abutted against the abutting section 103d, and therefore, the interlocking member 106 is stopped there. This state is identical to that shown in FIG. 3. The lens shutter is released, and the charge ring 114 is turned clockwise to the position indicated by the two-dot line from the position indicated by the solid line in FIG. 4.

Figure 5:
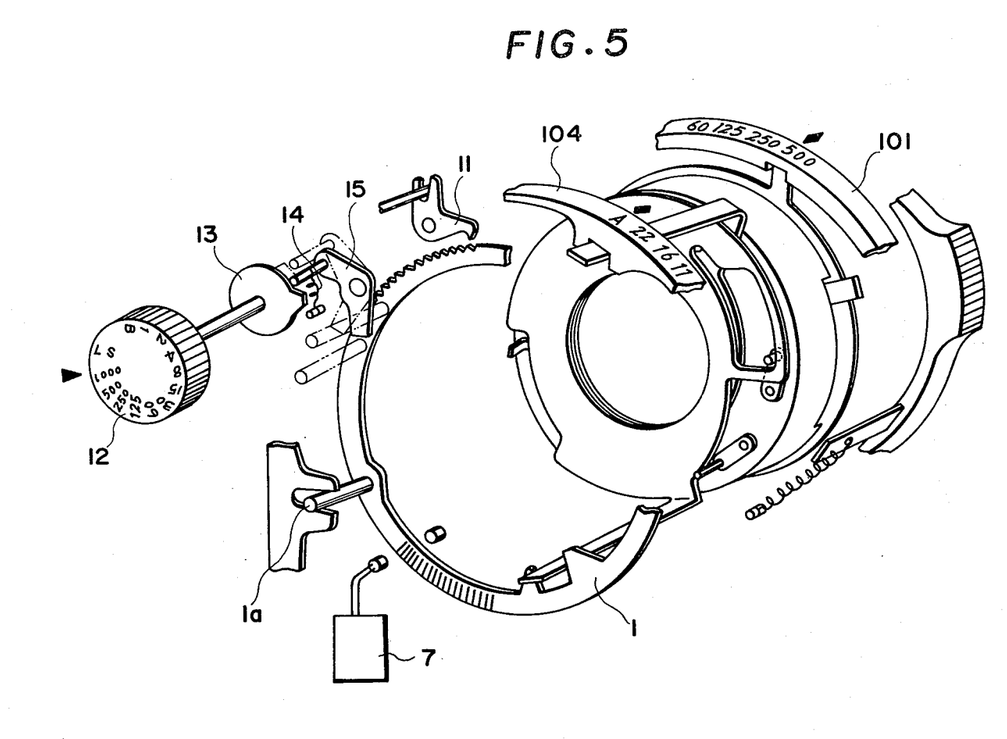
FIG. 5 is a perspective view for the case where the camera has EE control, the lens shutter use and non-use switching member on the camera side is switched over to the lens shutter non-use side, and the switching operation being effected by a blocking member in the camera. The states of various elements shown in FIG. 5 are those obtained prior to the operation of the camera.

Now, the case where the EE control is employed for a camera, the lens shutter use and non-use switching member is provided on the camera side, and the switching is carried out by a blocking member in the camera, will be described with reference to FIG. 5. The arrangement of FIG. 5 is different from that of FIG. 1 in that the lens shutter speed selector ring 101 has no "FP" and it serves merely to switch the lens shutter speeds. Because it is unnecessary to apply the signals representative of the lens shutter use and non-use to the camera from the lens shutter speed switching ring 101, the relay ring 102, the switching signal lever 103, the switching signal ring 5, the slide switch substrate 6, and the connection between the slide switch substrate 6 and the control circuit 7, which are shown in FIG. 1, are not provided in FIG. 5.

When the shutter dial 12 of the camera is set to one of the shutter speeds, such as 1000, 500, . . . 1, or to B, which is the lens shutter non-use range, the shutter speed of a mechanical control focal plane shutter (not shown) of the camera is set. In addition, a cam 13 integral with the shutter dial 12 causes a blocking lever 15, which is rotatably supported in the camera and is energized to turn counterclockwise by a spring 14 at all times, to be moved to the position as indicated by the solid line.

When the shutter dial 12 is set to "LS", the shutter speed of the mechanical control focal plane shutter is set to a constant speed such as ⅛ second, the cam 13 causes the blocking lever 15 to turn clockwise to the position as indicated by the two-dot chain line, and a signal representing that the EE control is not permitted (regardless of the set position of the aperture scale ring 104) is applied to the control circuit 7. If the shutter dial 12 is set to the lens shutter non-use range and the aperture scale ring 104 is set to "A", the EE control is effected during the photographing operation completely similarly as in the case of FIG. 1. On the other hand, if the aperture scale ring 104 is set to other than "A" and the camera is operated, the EE control is not carried out. Furthermore, unlike the case of FIG. 1, the locking operation of the locking lever 11 is not effected, and therefore the aperture drive member 1 tends to pass through the aperture operation range; however, as the pin 1a is stopped by the blocking lever 15 at the position indicated by the one-dot chain line, the aperture drive member 1 is maintained in the aperture operation range. If the camera is operated with the shutter dial 12 set to "LS" representative of the lens shutter non-use position, the EE control is not effected, and the pin 1a is moved over to the position indicated by the two-dot chain line without being stopped by the blocking lever 15. As a result, the sector preliminary closure and the lens shutter release are carried out.

Even if the EE control is removed from the arrangement shown in FIG. 5, switching the lens shutter from the use and non-use mode can be achieved using the same method as that used in the embodiment of FIG. 1. In addition, if blocking member 15, cam 13 and spring 14 are removed from the arrangement shown in FIG. 5, and a switching mechanism (not shown) described below is added, then the lens shutter use and non-use switching utilizing the EE control described with reference to FIGS. 1 through 3 can be obtained. The switching mechanism applies the lens shutter non-use signal to the control circuit 7 when the shutter dial 12 is set to the lens shutter non-use range, and applies the lens use signal to the control circuit 7 when the shutter dial 12 is set to the lens shutter use range.

In the present invention described above, the sector preliminary closure and the lens shutter release are interlocked with the interlocking member, and switching between lens shutter use and non-use is effected by the difference between the amounts of operation of the interlocking member. The lens shutter use and non-use can be switched only by using the relating means disposed between the aperture drive member of the camera and the interlocking member of the lens. This relating means is substantially identical to that used in an ordinary interchangeable lens not having a lens shutter but having an automatic aperture. Therefore, it is unnecessary to provide additional relating means for the switching operation.

For the arrangement of a lens shutter in a conventional lens shutter type single lens reflex camera, a lens-stopping, a sector preliminary closure and a lens shutter release are required. However, if a delay time defined by the lens shutter release to the lens shutter operation or alternatively, the sector opening to the sector closing, is provided by adding a governer, the operation of the present invention can be achieved with such an arrangement without major modifications.

In the present invention, the above-described difference between the amounts of operation of the interlocking member can be provided using one of two systems: a system utilizing the EE control mechanism of a camera, and a system in which a blocking member provided for a camera or a lens is utilized. Each of these two systems can be achieved using one of two methods: the first method is where the lens shutter use and non-use switching member is provided for the camera, and the second method is where the lens shutter use and non-use switching member is provided for the lens. The relationships among these four systems and the embodiments of the present invention, as shown in FIGS. 1 through 5, are shown in Table 1.

types A and B, it is not possible to increase the number of types of cameras without EE control.

As was described above, in the focal plane shutter control system according to the present invention, the relating members between the camera and the lens, the amount of operation of the aperture drive member, and the presence or absence of the camera EE control each exhibit advantages and disadvantages. Thus, the degree of freedom as to the lens shutter use and non-use switching system is increased considerably by the present invention.

The switching member is commonly used as the focal plane shutter speed switching dial of the camera or as the lens shutter speed selector ring; however, it is obvious that it may be provided separately as a switching member for the camera or the lens.

When the lens shutter is not used, the interchangeable lens with the lens shutter can be used in an identical

TABLE 1

| The difference between the amount of operation of the interlocking member | The camera's EE control is utilized. | The switching member is on the camera side. | The blocking member is removed from FIG. 5. | ...Type A |
| --- | --- | --- | --- | --- |
| | | The switching member is on the lens side. | FIG. 1 through FIG. 3 | ...Type B |
| | The blocking member for the camera or the lens is utilized. | The switching member is on the camera side. | FIG. 5 | ...Type C |
| | | The switching member is on the lens side | FIG. 4 | ...Type D |

The four types shown in Table 1 are referred to as types A, B, C and D. The advantages and disadvantages of these four types will now be described.

Control of the mechanical control focal plane shutter is more difficult than that of the electrical control focal plane shutter. However, types A and C having the switching member on the camera side can more readily be used with a mechanical control focal plane shutter. But types B and D also can be used with a mechanical control focal plane shutter if the movement of the switching signal ring is made in association with the focal plane shutter control mechanism so as to be in proper operational relationship with the lens shutter.

With respect to the number of relating members between the camera and the lens, one pair of relating members, i.e., the aperture drive member for the camera side, and the interlocking member for the lens side, are enough for types A and C having the switching member on the camera side. In comparison, one more pair of relating members, i.e., the switching signal ring for the camera side, and the switching signal lever for the lens side, are necessary for types B and D than those for types A and C. It is preferable in view of the sector preliminary closure and lens shutter release that the amount of operation of the aperture drive member is not too great. For this reason, types C and D in which the EE control is not utilized are advantageous. However, in type C with the EE control (FIG. 4), it is necessary to decrease the EE control range of an interchangeable lens with a lens shutter in order to provide the sector preliminary closure range and the lens shutter release range.

Types C and D at first appear to be advantageous because they do not use an EE control. In the case of fashion as that of an ordinary interchangeable lens. Therefore, the possible uses of the interchangeable lens with the lens shutter is increased.

The switching operations of the lens shutter use and non-use switching member of the present invention, whether the switching member is provided for the camera or the lens, the operation both controls the lens shutter, and simultaneously controls the shutter speed of the focal plane shutter. Therefore, only one switching member is required by the present invention.

What is claimed is:

1. A lens shutter use and non-use switching device of an interchangeable lens having a lens shutter for use with a focal plane shutter single lens reflex camera, the improvement comprising:
   (a) use means sensing a non-use setting and a plurality of lens shutter speed settings for providing a first movement indicating use of said lens shutter and a second movement indicating non-use of said lens shutter;
   (b) switch means responsive to said first movement of said use means for generating a use electrical control signal and responsive to said second movement of said use means for generating a non-use electrical control signal;
   (c) aperture ring means sensing an automatic setting and a plurality of manual F-stop settings for providing an automatic setting movement indicating automatic aperture control and a plurality of manual F-stop setting movements indicating manual F-stop settings;
   (d) lens shutter means disposed in the optical axis of said interchangeable lens for providing a shutter operation, said lens shutter means normally in the sector open state, said lens shutter means going to the sector closed state on command of a sector closing movement and providing a shutter action of a selected time duration on command of a release movement, said selected time duration being determined by said plurality of lens shutter speed settings when said use means senses use of said lens shutter;

(e) aperture means disposed in said optical axis for providing aperture operation in accordance with said plurality of manual F-stop settings when said aperture ring means is in said manual F-stop setting range;

(f) control means responsive to said use and non-use electrical control signals from said switch means and responsive to the depression of a release button, for maintaining said lens shutter means in said normal sector open state when said non-use electrical control signal is sensed, and when said use electrical control signal is sensed, for providing a sector closing movement to cause said lens shutter means to go to the sector closed state after the depression of said release button, for causing said focal plane shutter to be changed from said fully closed state to the fully open state after said sector closing movement has been completed, for providing a release movement to said lens shutter means after said focal plane shutter has reached said fully open state, and for causing said focal plane shutter to be changed to the fully closed state after said shutter action of said lens shutter means has been completed; and automatic aperture control means responsive to an automatic aperture control signal for controlling the aperture opening of said aperture means, and further comprising an electronic eye means for providing an automatic control signal to said automatic aperture control means when said automatic setting movement from said aperture ring means is sensed, and wherein said control means allows said aperture opening to be set by said automatic aperture control means subsequent to the sensing of said use electrical control signal and said release button depression and prior to providing said sector closing movement.

2. The lens shutter use and non-use switching device as recited in claim 1, wherein said aperture ring means includes a manual control cam ring 116 means disposed around said optical axis, said manual control cam ring 116 is mounted for rotation on a lens shutter body 105, and is provided with a cam surface 116a.

3. The lens shutter use and non-use switching device as recited in claim 2, wherein said automatic control means includes an interlocking member 106 disposed around said optical axis, said interlocking member 106 is mounted for rotation on said lens shutter body 105, and is provided with a release lever abutting cam surface 106d, an electrical eye control cam surface 106b, and a closing cam surface 106c, said electric eye control cam surface 106b is adjacent said cam surface 116a of said aperture ring means.

4. The lens shutter use and non-use switching device as recited in claim 3, wherein said control means includes a sector opening and closing lever 110 rotatably mounted by a pin 110a to said lens shutter body 105 and in sliding engagement with said closing cam surface 106c for providing said sector closing movement, and wherein said control means further includes a release lever 117 rotatable mounted by a pin to said lens shutter body 105 and in sliding engagement with said release lever abutting cam section 106d for providing said release movement.

5. The lens shutter use and non-use switching device as recited in claim 4, wherein said aperture means includes an aperture control lever 108 mounted for rotation by a pin 108a to said lens shutter body 105 and in sliding engagement with said electronic control cam surface 106b or with said cam surface 116a in accordance with the rotational position of said interlocking member 106.

6. The lens shutter use and non-use switching device as recited in claim 1, wherein said use means includes a lens shutter speed selector ring 101 mounted for movement on a housing of said interchangeable lens, and wherein said use means further includes a relay ring 102 disposed in said housing and mounted for rotation about said optical axis, said relay ring 102 having an interlocking lever for connection with speed selector ring 101 for causing said relay ring 102 to be moved in accordance with the movement of said speed selector ring 101, and said relay ring 102 having a pin 102a.

7. The lens shutter use and non-use switching device as recited in claim 6, wherein said use means further includes a switching signal lever 103 disposed in said housing and mounted for rotation about said optical axis, said switching signal lever 103 provided with a cam surface 103c in sliding engagement with said rod 102a, and said switching signal lever 103 provided with a rod 103b.

8. The lens shutter use and non-use switching device as recited in claim 7, wherein said means further includes a switching signal ring 5 disposed in the body of said single lens reflex camera and mounted for rotation about said optical axis, said ring 5 provided with a protrusion 5a in abutting engagement with said rod 103b, said switching signal ring 5 spring biased and provided with a electrically insulated brush 5b.

9. The lens shutter use and non-use switching device as recited in claim 8, wherein said switching means includes a slide switch substrate 6 fixedly secured to said body and in electrical sliding engagement with said electrically insulated brush 5b.

10. The lens shutter use and non-use switching device as recited in claim 9 wherein said lens shutter means includes a speed conversion ring 115 disposed in said housing and mounted for rotation about said optical axis, said speed conversion ring 115 being in engagement with a groove provided on said lens shutter speed selector ring 101.

11. The lens shutter use and non-use switching device as recited in claim 5, wherein said automatic control means further includes an aperture drive member 1 disposed in said body and mounted for rotation about said optical axis, said aperture drive member 1 is provide with a notch 1c which is in engagement with an interlocking member 106b fixedly secured to said interlocking member 106.

* * * * *